(12) United States Patent
Li et al.

(10) Patent No.: US 9,777,210 B2
(45) Date of Patent: Oct. 3, 2017

(54) INORGANIC FINE PARTICLE REINFORCED FOAM SYSTEM FOR OIL-GAS FIELD AND PREPARATION METHOD THEREOF

(71) Applicant: China University of Petroleum, Qingdao (CN)

(72) Inventors: Zhaomin Li, Qingdao (CN); Qichao Lv, Qingdao (CN); Binfei Li, Qingdao (CN); Binglin Li, Qingdao (CN); Songyan Li, Qingdao (CN); Teng Lu, Qingdao (CN); Qian Sun, Qingdao (CN); Yajie Xu, Qingdao (CN)

(73) Assignee: CHINA UNIVERSITY OF PETROLEUM, Qingdao (CN)

( * ) Notice: Subject to any disclaimer, the term of this patent is extended or adjusted under 35 U.S.C. 154(b) by 0 days.

(21) Appl. No.: 15/519,540

(22) PCT Filed: Aug. 4, 2016

(86) PCT No.: PCT/CN2016/093191
§ 371 (c)(1),
(2) Date: Apr. 15, 2017

(87) PCT Pub. No.: WO2017/050024
PCT Pub. Date: Mar. 30, 2017

(65) Prior Publication Data
US 2017/0240800 A1    Aug. 24, 2017

(30) Foreign Application Priority Data

Sep. 21, 2015   (CN) .......................... 2015 1 0600689

(51) Int. Cl.
| | | |
|---|---|---|
| C09K 8/68 | (2006.01) | |
| C09K 8/594 | (2006.01) | |
| C09K 8/74 | (2006.01) | |
| C09K 8/536 | (2006.01) | |
| C09K 8/70 | (2006.01) | |
| C09K 8/58 | (2006.01) | |

(52) U.S. Cl.
CPC .............. *C09K 8/594* (2013.01); *C09K 8/536* (2013.01); *C09K 8/58* (2013.01); *C09K 8/68* (2013.01); *C09K 8/703* (2013.01); *C09K 8/74* (2013.01)

(58) Field of Classification Search
None
See application file for complete search history.

(56) References Cited

U.S. PATENT DOCUMENTS

| | | | | |
|---|---|---|---|---|
| 2009/0325780 | A1* | 12/2009 | Gauckler | A61L 27/105 501/84 |
| 2013/0118748 | A1* | 5/2013 | Miquilena | C09K 8/5045 166/305.1 |
| 2015/0021022 | A1* | 1/2015 | Ladva | C09K 8/805 166/276 |
| 2015/0369029 | A1* | 12/2015 | Potapenko | E21B 43/267 166/280.2 |

OTHER PUBLICATIONS

Qian, S. et al Synergentic Effect on Foam . . . 2014.

* cited by examiner

*Primary Examiner* — Alicia Bland
(74) *Attorney, Agent, or Firm* — CBM Patent Consulting, LLC

(57) ABSTRACT

A novel inorganic fine particle reinforced foam system for an oil-gas field and preparation method thereof. The reinforced foam system comprises a gas phase and a liquid phase; the gas phase is nitrogen, carbon dioxide or the air; the liquid phase is prepared from, by mass: 0.2-0.8 wt % of a foaming agent, 0.5-2.0 wt % of novel inorganic fine particles and balance of water; the novel inorganic fine particles are fine particulate matter with diameters being smaller than or equal to 2.5 microns captured and screened from the atmosphere.

9 Claims, No Drawings

INORGANIC FINE PARTICLE REINFORCED FOAM SYSTEM FOR OIL-GAS FIELD AND PREPARATION METHOD THEREOF

This application is the U.S. national phase of International Application No. PCT/CN2016/093191 filed on Aug. 4, 2016 which designated the U.S. and claims priority to Chinese Application Nos. CN201510600689.6 filed on Sep. 21, 2015, the entire contents of each of which are hereby incorporated by reference.

TECHNICAL FIELD

The invention relates to a novel inorganic fine particle reinforced foam system for an oil-gas field and preparation method thereof, and belongs to the technical field of oil-gas field development engineering.

BACKGROUND ART

Foam fluid is widely used in the oil-gas field development field at home and abroad, and is evaluated as an intelligent fluid which is high in performance, environment-friendly, low in cost and low in damage. Foam fluid is applied in the whole process of oil-gas field development, from drilling fluid, completion fluid and fracturing fluid for drilling engineering, to an oil-displacing agent, a profile control agent, a water shutoff agent and an acidifying agent for oil production engineering, and even sand cleaning fluid and flushing fluid for workover treatment. Furthermore, foam fluid has an irreplaceable excellent effect for a plurality of formations with low permeability, low pressure and low saturability. A large number of oil and gas field production applications prove that the application of foam fluid can improve oil and gas production, protect oil and gas reservoirs and reduce production costs.

Foam fluid has been applied to oil-gas field development for over 50 years, however, there are still some problems for improvement of the foam application process, wherein stability of foam is a primary bottleneck that hinders the foam development. Foam is a thermodynamics unstable system and can finally break and disappear. The unstability of foam in formations is mainly represented by coalescence of bubbles in foam, precipitation of liquid in foam, and break of foam.

In recent years, there are mainly two ways to improve the stability of foam in the oil-gas field development field. The first way is to increase the viscosity of base fluid, so as to reduce the precipitation speed of foam and prolong gas-liquid separation time, which is mainly achieved by adding vegetable gelatin, artificially synthesized polymers, protein and crosslinking frozen gel to foam. However, the defect of the way is that due to the fact that insoluble residues and unbroken gel constituents are inevitable in vegetable gelatin and polymers, a pore throat structure in formations can be blocked to cause damage to formations, and further affect the productivity of oil-gas wells. For example, the Chinese patent document CN101805600A (application number: 201010150239.9) discloses a frozen gel fracturing fluid suitable for coalbed methane reservoirs. The frozen gel fracturing fluid consists of, by mass, 0.3-0.5% of nonionic polyacrylamide, 0.014-0.04% of zirconium oxychloride ($ZrOCl_2$) which serves as a cross-linking agent, 0.01-0.12% of hydrochloric acid which serves as a pH modifier, 0.06-0.12% of gel breaker and balance of water, wherein the gel breaker is a redox system consisting of ammonium persulfate and sodium sulfite by a mass ratio of (1.0-3.0):1, and can break frozen gel at a low temperature. The frozen gel fracturing fluid disclosed in the patent document is adjustable in gelation time and gel breaking time, and has the advantages that low-temperature crosslinking speed is high, viscosity is high, filtration loss is low, gel breaking is complete, and gel breaking liquid is free of residue and can flow back easily. The frozen gel fracturing fluid can effectively improve coalbed methane productivity. However, in actual production, a coalbed adsorbs a large number of polymer molecules to cause damage to formations; besides, due to the uncontrollability of the construction process, a cross-linked polymer solution and the gel breaker cannot be fully mixed, which can cause non-uniform gel breaking, and then formations can be further damaged.

The second way of improving foam stability is to improve the mechanical strength of a foam liquid film, so as to improve the impact resistance and disturbance resistance of the liquid film, and further reduce foam break. The second way is mainly achieved by adding a particle foam stabilizer to the foam. For example, Chinese patent document CN102746841 A (application number: 201210223060.0) discloses a composite foam system containing nano-particles for an oil-gas field and a preparation method thereof. The composite foam system consists of, by mass, 0.3-0.5 part of anionic surfactant, 1-1.5 parts of modified silicon dioxide nano-particles, 0.03-2.3 parts of countra-ion salt and 100 parts of water. The components are mixed according to a certain ratio and stirred with a magnetic stirrer, and then left standstill. The mixture is stirred rapidly with the Waring Blender method to obtain foams with high stability. The foams produced by means of the composite foam system has a longer half-life period than the foams stabilized by an ordinary surfactant, but has a larger foaming volume than the foams produced by adding a foam stabilizer. The composite foam system has a simple formula and preparation technology as well as high salt tolerance and temperature tolerance, can be adapted to underground complicated oil deposit conditions, does not pollute formations, can effectively block macropore channels and improve sweep efficiency, and has great application prospects in oilfield development application, especially foam displacement. However, the usage of silicon dioxide nano-particles which are high in manufacturing cost in the composite foam system is high, and therefore the economic feasibility of applying silicon dioxide nano-particles to oil-gas development engineering is low.

SUMMARY OF THE INVENTION

Aiming at the defects of the prior art, the invention provides a novel inorganic fine particle reinforced foam system for an oil-gas field and preparation method thereof.
Term Description:

Foam quality refers to the percentage that the volume of gas in foam accounts for the total volume of the foam.

A Waring Blender method is one of the most commonly used stir-bubbling methods, in which a foam base solution is stirred in a high-speed stirrer at a certain rotating speed for a while to generate foam.

The technical solution of the invention is:

A novel inorganic fine particle reinforced foam system for an oil-gas field comprises a gas phase and a liquid phase;

The gas phase is nitrogen, carbon dioxide or the air;

The liquid phase is prepared from, by mass:

0.2~0.8 wt % of foaming agent, 0.5~2.0 wt % of novel inorganic fine particles and balance of water; the novel inorganic fine particles are fine particulate matter with diameters being smaller than or equal to 2.5 microns captured and screened from the atmosphere. The raw constituents foaming agent and novel inorganic fine particles in the liquid phase can be both dissolved in tap water, river water or formation water.

According to the invention, preferably, the foaming agent is a compound system composed of sasanqua saponin and sodium N-lauroylglutamate by a mass ratio of (5-6):1.

According to the invention, preferably, in the novel inorganic fine particles, a percentage that the two substances mullite (Al6Si2O13) and quartz (SiO2) account for the novel inorganic fine particles is greater than or equal to 75 wt %;

Preferably, the surfaces of the novel inorganic fine particles are hydrophilic, and the wetting angle of the surfaces to water is 20-50 degrees. The novel inorganic fine particles can be well dispersed in tap water, river water or formation water.

Preferably, the surfaces of the novel inorganic fine particles are positively charged.

According to the invention, preferably, the concentration ratio of the novel inorganic fine particles to the foaming agent is (2-4):1. Under this concentration ratio, a good synergistic effect can be generated between the foaming agent and the novel inorganic fine particles and is macroscopically represented by the fact that the foam produced has a large foaming volume and a long half-life period; microcosmically represented by the fact that fine particles are adsorbed onto gas-liquid interfaces in foam, a layer of effective particles are formed on the surfaces of bubbles to wrap the bubbles inside, and then coalescence between bubbles and break of liquid films are relieved. Under this concentration ratio, usage of the foaming agent and the novel inorganic fine particles can also be reduced.

According to the invention, preferably, when the gas phase is nitrogen, the mass range of the foam of the reinforced foam system is 50-90%, preferably 60-80%;

When the gas phase is the air, the mass range of the foam of the reinforced foam system is 57-90%, preferably 64-80%;

When the gas phase is carbon dioxide, the mass range of the foam of the reinforced foam system is 61-87%, preferably 67-79%.

According to the invention, preferably, the gas phase is nitrogen. When the gas phase is nitrogen, generated foam is the most stable, manifested by that the precipitation half-life period and volume half-life period of foam under high temperature and high pressure are the longest.

The invention further provides two preparation methods of novel inorganic fine particle reinforced foam for the oil-gas field, one is a foam preparation method for laboratory evaluation, and the other one is a ground foam preparation method for site operation of the oil-gas field.

The foam preparation method for laboratory evaluation according to the invention comprises:

adding the foaming agent to water according to a certain ratio, stirring to prepare a foaming agent solution, then adding the novel inorganic fine particles, and stirring for 10-20 min to obtain a foam base solution;

Stirring the foam base solution with the Waring Blender method until there are foams for 3-10 min at a speed of 6000-8000 r/min to obtain the final product. After stirring, the foam is poured into a measuring cylinder of 1000 mL, the initial volume of the foam and time for separating out 50 mL liquid in the foam are recorded under normal temperature and normal pressure, and then the stability of the foam can be verified.

The ground foam preparation method for site operation of the oil-gas field according to the invention comprises:

adding the foaming agent to water according to a certain ratio, stirring for 1-3 min, then adding the novel inorganic fine particles, and stirring for 5-10 min to obtain a foam base solution;

mixing the foam base solution with the gas phase and then directly injecting the mixture in a pit when the reinforced foam system is applied to displacement of reservoir oil, fracturing, profile control and water shutoff, so that preparation and application of the foam system are achieved; the foam base solution and the gas phase can be mixed for foaming in tubular columns and formations;

Pumping the foam base solution into a foam generator to be mixed with the gas phase for foaming when the reinforced foam system is applied to sand wash, well flushing, acidification, drainage and induced flow to obtain the final product. During application, the reinforced foam system is injected into a pit in the form of foam. The foam generator is the prior art, referring to a foam generated disclosed in Chinese patent document CN 2743529 Y.

The invention has the advantages that:

(1) The reinforced foam system of the invention can be used for displacement of reservoir oil, fracturing, profile control, water shutoff, sand wash, well flushing, acidification, drainage, induced flow and the like, and has the advantages of being low in damage to formations and high in performance.

(2) The reinforced foam system of the invention can effectively work within the high pressure range of 0-100 MPa and the high temperature range of 0-200 DEG C.

(3) The reinforced foam system of the invention forms particle layers with bubbles wrapped in fine particles, a skeleton structure of the foam is especially stable, and the liquid films are rigid; as a result, the foam has the advantages of being high in sand-carrying capacity, good in blocking effect, low in filtration loss, high in reservoir oil displacement capacity and the like.

(4) By the adoption of the reinforced foam system of the invention, effective development of oil-gas resources is facilitated; besides, by utilizing the novel inorganic fine particles, waste can be turned into wealth, and pollution of the novel inorganic fine particles to the air and the environment is reduced.

(5) According to the reinforced foam system of the invention, cost of raw materials is low, the preparing process is simple, operation cost is low, the oil-gas yield increasing effect is good, and economic benefits are high.

DETAILED DESCRIPTION OF THE INVENTION

The invention is further described with specific embodiments herein, while the protection range of the invention is not limited to the scope of the embodiments.

Novel inorganic fine particles adopted in the embodiments come from the Shengli Power Plant of Shengli Petroleum Administrative Bureau, the wetting angle of particle surfaces to distilled water is 43.2 degrees, particle surfaces are positively charged, and the mass ratios of O element, Si element and Al element in the novel inorganic fine particles are 42.3 wt %, 23.2 wt % and 21.5 wt % respectively.

Embodiment 1

A novel inorganic fine particle reinforced foam system for an oil-gas field comprises a gas phase and a liquid phase; the gas phase is nitrogen, and the liquid phase is prepared from, by mass:

0.5 wt % of foaming agent, 1.0 wt % of novel inorganic fine particles and balance of water;

The foaming agent is a compound system composed of sasanqua saponin and sodium N-lauroylglutamate by a mass ratio of 6:1; the novel inorganic fine particles are fine particulate matter with diameters being smaller than or equal to 2.5 microns captured and screened from the atmosphere.

A preparation method comprises:

Adding the foaming agent to 100 mL water according to a certain ratio, stirring to prepare a foaming agent solution, then adding the novel inorganic fine particles, and stirring for 15 min on a magnetic stirrer to obtain a foam base solution. Stir-bubbling is conducted on the 100 mL foam base solution with the Waring Blender method for 5 min at a speed of 7000 r/min, so that the reinforced foam system is obtained. After stirring, the reinforced foam system is poured into a measuring cylinder of 1000 mL, the initial volume 370 mL of the foam and time 42.0 min for separating out 50 mL liquid in the foam are recorded under normal temperature and normal pressure, and then good foamability and foam stability are realized.

Embodiment 2

A novel inorganic fine particle reinforced foam system for an oil-gas field comprises a gas phase and a liquid phase, the gas phase is the air, and the liquid phase is prepared from, by mass:

0.5 wt % of foaming agent, 1.0 wt % of novel inorganic fine particles and balance of water;

The foaming agent is a compound system composed of sasanqua saponin and sodium N-lauroylglutamate by a mass ratio of 6:1; the novel inorganic fine particles are fine particulate matter with diameters being smaller than or equal to 2.5 microns captured and screened from the atmosphere.

A preparation method comprises:

Adding the foaming agent to 100 mL water according to a certain ratio, stirring to prepare a foaming agent solution, then adding the novel inorganic fine particles, and stirring for 15 min on a magnetic stirrer to obtain a foam base solution. Stir-bubbling is conducted on the 100 mL foam base solution with the Waring Blender method for 5 min at a speed of 7000 r/min, so that the reinforced foam system is obtained. After stirring, the foam is poured into a measuring cylinder of 1000 mL, the initial volume 390 mL of the foam and time 36.0 min for separating out 50 mL liquid in the foam are recorded under normal temperature and normal pressure, and then good foamability and foam stability are realized.

Embodiment 3

A novel inorganic fine particle reinforced foam system for an oil-gas field comprises a gas phase and a liquid phase, and the gas phase is carbon dioxide. The liquid phase is prepared from, by mass:

0.5 wt % of foaming agent, 1.0 wt % of novel inorganic fine particles and balance of water;

The foaming agent is a compound system composed of sasanqua saponin and sodium N-lauroylglutamate by a mass ratio of 6:1; the novel inorganic fine particles are fine particulate matter with diameters being smaller than or equal to 2.5 microns captured and screened from the atmosphere.

A preparation method comprises:

Adding surfactants in the foaming agent to 100 mL water in sequence according to certain ratios, stirring to prepare a foaming agent solution, then adding the novel inorganic fine particles, and stirring for 15 min on a magnetic stirrer to obtain a foam base solution. Stir-bubbling is conducted on the 100 mL foam base solution with the Waring Blender method for 5 min at a speed of 7000 r/min, so that the reinforced foam system is obtained. After stirring, the foam is poured into a measuring cylinder of 1000 mL, the initial volume 375 mL of the foam and time 28.0 min for separating out 50 mL liquid in the foam are recorded under normal temperature and normal pressure, and then good foamability and foam stability are realized.

Experimental Example

The reinforced foam systems obtained in the embodiments 1-3 are compared with a foam system which does not contain novel inorganic fine particles to obtain experiment data as shown in table 1:

TABLE 1

Parameter comparison between the reinforced foam systems and the pure surfactant foam system

| gas type | novel inorganic fine particles mass fraction/% | compound foaming agent mass fraction/% | half-life period/min | foaming volume/mL |
|---|---|---|---|---|
| nitrogen | 1.0 | 0.5 | 42.0 | 370 |
| carbon dioxide | 1.0 | 0.5 | 36.0 | 390 |
| air | 1.0 | 0.5 | 28.0 | 375 |
| nitrogen | 0 | 0.5 | 8.6 | 405 |
| carbon dioxide | 0 | 0.5 | 7.5 | 420 |
| air | 0 | 0.5 | 6.5 | 415 |

It can be seen from table 1 that the foam formed by the reinforced foam systems prepared by adding the novel inorganic fine particles is more stable than the foam formed by the foam system without adopting the novel inorganic fine particles.

Embodiment 4

A novel inorganic fine particle reinforced foam system for an oil-gas field comprises a gas phase and a liquid phase; the gas phase is nitrogen, and the liquid phase is prepared from, by mass:

0.2 wt % of foaming agent, 0.8 wt % of novel inorganic fine particles and balance of water;

The foaming agent is a compound system composed of sasanqua saponin and sodium N-lauroylglutamate by a mass ratio of 5:1; the novel inorganic fine particles are fine particulate matter with diameters being smaller than or equal to 2.5 microns captured and screened from the atmosphere.

A preparation method of the reinforced foam system applied to sand wash, well flushing, acidification, drainage and induced flow comprises:

adding the foaming agent to water according to a certain ratio, stirring for 3 min, then adding the novel inorganic fine particles, and stirring for 7 min to obtain a foam base solution;

Pumping the foam base solution into a foam generator to be mixed with nitrogen for foaming to obtain the final product. The mass range of the foam of the prepared reinforced foam system is 80%.

Embodiment 5

A novel inorganic fine particle reinforced foam system for an oil-gas field comprises a gas phase and a liquid phase, the gas phase is the air, and the liquid phase is prepared from, by mass:

0.8 wt % of foaming agent, 2.0 wt % of novel inorganic fine particles and balance of water;

The foaming agent is a compound system composed of sasanqua saponin and sodium N-lauroylglutamate by a mass ratio of 5.5:1; the novel inorganic fine particles are fine particulate matter with diameters being smaller than or equal to 2.5 microns captured and screened from the atmosphere.

A preparation method of the reinforced foam system applied to displacement of reservoir oil, fracturing, profile control and water shutoff comprises:

adding the foaming agent to water according to a certain ratio, stirring for 3 min, then adding the novel inorganic fine particles, and stirring for 7 min to obtain a foam base solution;

Mixing the foam base solution with the air and then directly injecting the mixture in a pit, so that preparation and application of the foam system are achieved; the foam base solution and the air can be mixed for foaming in tubular columns and formations; the mass range of the foam of the prepared reinforced foam system is 64%.

Embodiment 6

A novel inorganic fine particle reinforced foam system for an oil-gas field comprises a gas phase and a liquid phase, and the gas phase is carbon dioxide. The liquid phase is prepared from, by mass:

0.5 wt % of foaming agent, 1.5 wt % of novel inorganic fine particles and balance of water;

The foaming agent is a compound system composed of sasanqua saponin and sodium N-lauroylglutamate by a mass ratio of 5.5:1; the novel inorganic fine particles are fine particulate matter with diameters being smaller than or equal to 2.5 microns captured and screened from the atmosphere.

A preparation method of the reinforced foam system applied to displacement of reservoir oil, fracturing, profile control and water shutoff comprises:

adding the foaming agent to water according to a certain ratio, stirring for 3 min, then adding the novel inorganic fine particles, and stirring for 7 min to obtain a foam base solution;

Mixing the foam base solution with the air and then directly injecting the mixture in a pit, so that preparation and application of the foam system are achieved; the foam base solution and the air can be mixed for foaming in tubular columns and formations; the mass range of the foam of the prepared reinforced foam system is 70%.

What is claimed is:

1. A novel inorganic fine particle reinforced foam system for an oil-gas field, comprising a gas phase and a liquid phase, characterized in that,
   the gas phase is nitrogen, carbon dioxide or the air;
   the liquid phase is prepared from, by mass:
   0.2-0.8 wt % of a foaming agent, 0.5-2.0 wt % of novel inorganic fine particles and balance of water; the novel inorganic fine particles are fine particulate matter with diameters being smaller than or equal to 2.5 microns wherein the foaming agent is a compound system composed of sasanqua saponin and sodium N-lauroylglutamate by a mass ratio of (5-6):1.

2. The novel inorganic fine particle reinforced foam system for the oil-gas field according to claim 1, characterized in that in the novel inorganic fine particles, a percentage that the two substances mullite and quartz account for the novel inorganic fine particles is greater than or equal to 75 wt %.

3. The novel inorganic fine particle reinforced foam system for the oil-gas field according to claim 1, characterized in that the surfaces of the novel inorganic fine particles are hydrophilic, and the wetting angle of the surfaces to water is 20-50 degrees.

4. The novel inorganic fine particle reinforced foam system for the oil-gas field according to claim 1, characterized in that the surfaces of the novel inorganic fine particles are positively charged.

5. The novel inorganic fine particle reinforced foam system for the oil-gas field according to claim 1, characterized in that the concentration ratio of the novel inorganic fine particles to the foaming agent is (2-4):1.

6. The novel inorganic fine particle reinforced foam system for the oil-gas field according to claim 1, characterized in that when the gas phase is nitrogen, the mass range of the foam of the reinforced foam system is 50-90%, preferably 60-80%;
   when the gas phase is the air, the mass range of the foam of the reinforced foam system is 57-90%, preferably 64-80%;
   when the gas phase is carbon dioxide, the mass range of the foam of the reinforced foam system is 61-87%, preferably 67-79%.

7. The novel inorganic fine particle reinforced foam system for the oil-gas field according to claim 1, characterized in that the gas phase is nitrogen.

8. A preparation method of the reinforced foam systems in claim 1 comprises:
   adding a foaming agent to water according to a certain ratio, stirring to prepare a foaming agent solution, then adding novel inorganic fine particles, and stirring for 10-20 min to obtain a foam base solution;
   stirring the foam base solution with the Waring Blender method until there are foams for 3-10 min at a speed of 6000-8000 r/min, so that the reinforced foam system is obtained.

9. A preparation method of the reinforced foam systems in claim 1 comprises:
   adding a foaming agent to water according to a certain ratio, stirring for 1-3 min, then adding novel inorganic fine particles, and stirring for 5-10 min to obtain a foam base solution;
   mixing the foam base solution with a gas phase and then directly injecting the mixture in a pit when the reinforced foam system is applied to displacement of reservoir oil, fracturing, profile control and water shutoff, so that preparation and application of the foam system are achieved;
   pumping the foam base solution into a foam generator to be mixed with the gas phase for foaming when the reinforced foam system is applied to sand wash, well flushing, acidification, drainage and induced flow, so that the reinforced foam system is obtained.

* * * * *